(12) United States Patent
Nagashima et al.

(10) Patent No.: US 10,662,106 B2
(45) Date of Patent: May 26, 2020

(54) PRODUCTION METHOD FOR MULTICORE OPTICAL FIBER

(71) Applicant: SUMITOMO ELECTRIC INDUSTRIES, LTD., Osaka-shi, Osaka (JP)

(72) Inventors: Takuji Nagashima, Yokohama (JP); Tetsuya Nakanishi, Yokohama (JP)

(73) Assignee: SUMITOMO ELECTRIC INDUSTRIES, LTD., Osakai-shi, Osaka (JP)

( * ) Notice: Subject to any disclaimer, the term of this patent is extended or adjusted under 35 U.S.C. 154(b) by 312 days.

(21) Appl. No.: 15/901,214

(22) Filed: Feb. 21, 2018

(65) Prior Publication Data
US 2018/0244557 A1    Aug. 30, 2018

(30) Foreign Application Priority Data

Feb. 28, 2017  (JP) ................. 2017-037398

(51) Int. Cl.
| | |
|---|---|
| *C03B 37/14* | (2006.01) |
| *C03B 37/027* | (2006.01) |
| *G02B 6/02* | (2006.01) |
| *C03B 37/012* | (2006.01) |

(52) U.S. Cl.
CPC .... *C03B 37/02736* (2013.01); *C03B 37/0126* (2013.01); *C03B 37/01222* (2013.01); *C03B 37/01231* (2013.01); *C03B 37/01251* (2013.01); *C03B 37/02745* (2013.01); *C03B 37/02772* (2013.01); *G02B 6/02042* (2013.01); *C03B 2203/34* (2013.01); *C03B 2205/07* (2013.01); *C03B 2205/08* (2013.01); *C03B 2205/45* (2013.01)

(58) Field of Classification Search
CPC ........ C03B 37/14; G02B 6/255; G02B 6/2552
USPC .......................................................... 65/407
See application file for complete search history.

(56) References Cited

U.S. PATENT DOCUMENTS

| | | | | |
|---|---|---|---|---|
| 4,767,430 | A | * | 8/1988 | Deneka ............... G02B 6/4218 65/412 |
| 9,321,670 | B2 | | 4/2016 | Okada |
| 2007/0245773 | A1 | | 10/2007 | Peekhaus et al. |
| 2013/0061637 | A1 | | 3/2013 | Okada |

(Continued)

FOREIGN PATENT DOCUMENTS

JP        2006-160528 A     6/2006

*Primary Examiner* — Cynthia Szewczyk
(74) *Attorney, Agent, or Firm* — Faegre Drinker Biddle & Reath LLP

(57) ABSTRACT

There is provided a method for producing a multicore optical fiber while depressurizing holes in a common cladding tube. A production method for a multicore optical fiber includes a preform forming step of forming a common cladding tube having a plurality of holes extending between a first end and a second end, an end-face working step of digging the common cladding tube from the second end to a predetermined depth to forming a third end, a connection step of connecting a glass tube to the second end, an insertion step of inserting core rods into the holes to the third end, a sealing step of sealing the first end, and a drawing step of spinning the multicore optical fiber while depressurizing the holes through the glass tube and combining the common cladding tube and the core rods from the first end.

4 Claims, 6 Drawing Sheets

(56) References Cited

U.S. PATENT DOCUMENTS

2015/0274577 A1\* 10/2015 Nakanishi ......... C03B 37/01222
                                                           65/378

\* cited by examiner

PRODUCTION METHOD FOR MULTICORE OPTICAL FIBER

BACKGROUND OF THE INVENTION

Field of the Invention

The present invention relates to a production method for a multicore optical fiber.

Description of the Related Art

Recently, the amount of data transmitted through optical fibers by optical communication has been increasing. One reason for this is that the amount of communication data using mobile phones has increased and this has increased the amount of communication data between base stations and between base stations and telecommunication carriers. In television broadcasting, for example, so-called 4K broadcasting and 8K broadcasting have been partly started or are scheduled, and the amount of communication data has been increased by distribution of broadcasting through cable television.

To cope with the increase in communication data amount, multicore optical fibers each of which includes a plurality of cores have been actively studied and reported. In a multicore optical fiber, a plurality of cores are disposed in a common cladding made of glass in an extending direction (axial direction) of the optical fiber. Since an uncoupled-core multicore optical fiber allows communication data to be transmitted and received through each core, the amount of communication data can be increased in accordance of the number of cores. In a coupled-core multicore optical fiber, communication data transfers between cores. However, since the communication data can be separated by signal processing on the receiving side, the amount of communication data can be increased in accordance with the number of cores.

In a known production method for a multicore optical fiber, after core rods made of silica glass are inserted in a plurality of holes of a common cladding tube made of silica glass, drawing is performed while combining the common cladding tube and the core rods. In this method, it is known to perform drawing while depressurizing the holes through a glass tube connected to an end portion opposite from the end portion to be drawn (see, for example, Japanese Unexamined Patent Application Publication No. 2006-160528).

SUMMARY OF THE INVENTION

An object of the present invention is to provide a method for producing a multicore optical fiber, the method including drawing the multicore optical fiber while reliably depressurizing the insides of holes in a common cladding tube and combining the common cladding tube and core rods.

A production method for a multicore optical fiber according to the present invention includes (1) a preform forming step of forming a common cladding tube made of silica glass and having a plurality of holes extending in an axial direction between a first end and a second end, (2) an end-face working step of digging the common cladding tube except for an outer peripheral portion from the second end toward the first end to a predetermined depth to form a third end, (3) a connection step of connecting a glass tube to the second end, (4) an insertion step of inserting core rods made of silica glass into the plurality of holes of the common cladding tube to the third end, (5) a sealing step of sealing the plurality of holes at the first end, and (6) a drawing step of spinning the multicore optical fiber while depressurizing insides of the plurality of holes through the glass tube and combining the common cladding tube and the core rods from the first end.

In the production method for the multicore optical fiber according to the present invention, the predetermined depth may be 20 mm or more. A tensile stress (M/S) applied to a connecting interface between the common cladding tube and the glass tube in the drawing step may be 2 kgf/cm$^2$ or less. Here, S represents a connection area between the common cladding tube and the glass tube, and M represents a force applied to the connecting interface in the drawing step and this is the sum of weights of the common cladding tube, the core rods inserted in the plurality of holes in the common cladding tube, and the glass block connected in the sealing step. The sealing step may include connecting a glass block to the first end to seal the plurality of holes at the first end.

According to the present invention, it is possible to produce the multicore optical fiber while reliably depressurizing the insides of the holes in the common cladding tube and combining the common cladding tube and core rods.

DESCRIPTION OF THE PREFERRED EMBODIMENT

Figure 1:
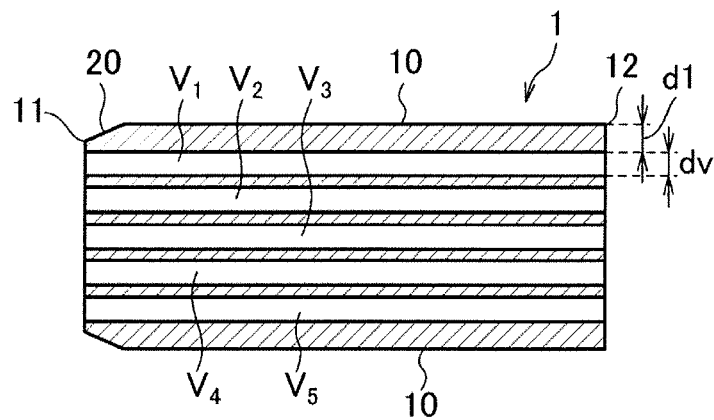
FIG. 1 illustrates a preform forming step in a production method for a multicore optical fiber according to an embodiment of the present invention.

An embodiment of the present invention will be described in detail below with reference to the attached drawings. The same elements will be denoted by the same reference signs in the drawings, and redundant descriptions thereof are sometimes skipped. It should be noted that the present invention is by no means intended to be limited to these examples presented by way of illustration but is intended for inclusion of all changes within the scope of equivalence to the scope of claims, as described in the scope of claims.

A preferable multicore optical fiber has the same glass diameter as that of a conventional optical fiber while including a plurality of cores. For that purpose, the inner diameter of holes formed in a common cladding tube used for drawing and the outer diameter of core rods inserted in the holes are decreased, and the thickness between the holes on the outermost periphery in the common cladding tube and the outer periphery of the common cladding tube is decreased. Since it is necessary to connect a glass tube to an end portion of the common cladding tube opposite from an end portion to be drawn in order to perform depressurization during drawing, when the thickness between the holes on the outermost periphery in the common cladding tube and the outer periphery of the common cladding tube is decreased, the connected glass tube closes the holes on the outermost periphery, and this sometimes hinders sufficient depressurization in the holes. For this reason, bubbles are left in a produced multicore optical fiber, and this sometimes lowers the quality.

Embodiment

FIG. 1 illustrates a preform forming step in a production method for a multicore optical fiber according to an embodiment of the present invention. In production of a multicore optical fiber, a common cladding tube 1 is first formed in a preform forming step. FIG. 1 is a sectional side view of the common cladding tube 1.

The common cladding tube 1 is made of silica glass. The common cladding tube 1 includes a first end 11, a second end 12, and an outer peripheral portion 10. Inside the common cladding tube 1, a plurality of holes extend in the axial direction between the first end 11 and the second end 12. The term "axial direction" refers to a direction from the first end 11 to the second end 12 or a direction opposite therefrom. While holes $V_1$ to $V_5$ are illustrated in FIG. 1, holes can be arranged in a hexagonal close-packed structure to increase the arrangement density of the holes. In the hexagonal close-packed structure, when the common cladding tube 1 is viewed from the first end 11 or the second end 12, the hole $V_3$ is disposed in the center and the holes including the holes $V_2$ and $V_4$ are disposed at apexes of a hexagon centered on the position of the hole $V_3$. Further, other holes including $V_1$ and $V_5$ can be arranged toward the outer peripheral portion 10. As will be described later, core rods are inserted in the holes $V_1$ to $V_5$.

The core rods to be inserted in the holes $V_1$ to $V_5$ form a part of a cladding and cores in the optical fiber. For this reason, to increase the number of cores without changing the diameter of the optical fiber, it is necessary to decrease an inner diameter dv of the holes $V_1$ to $V_5$ and the outer diameter of the core rods and to reduce a thickness d1 between the holes $V_1$ and $V_5$ on the outermost periphery inside the common cladding tube 1 and the outer peripheral portion 10 of the common cladding tube 1.

Figure 2A:
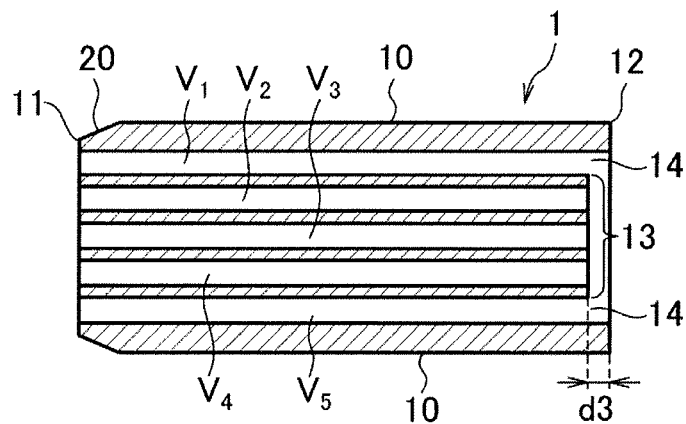
FIGS. 2A and 2B illustrate an end-face working step in the production method for the multicore optical fiber according to the embodiment.
Figure 2B:
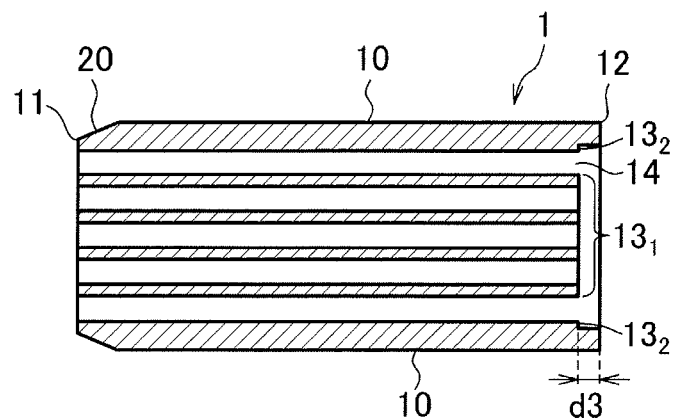

FIGS. 2A and 2B illustrate an end-face working step in the production method for the multicore optical fiber according to the embodiment of the present invention. FIG. 2A illustrates a state after the common cladding tube 1 is dug from the second end 12 toward the first end 11 except for the outer peripheral portion 10. By digging the common cladding tube 1 in the axial direction, a portion except for the outer peripheral portion 10 forms a third end 13 on the side of the second end 12. The third end 13 is formed inside the outer peripheral portion 10 on the side of the second end 12.

In FIG. 2A, d3 represents the depth by which the common cladding tube 1 is dug from the second end 12. The depth d3 is preferably 20 mm or more. This is because, as illustrated in FIG. 2B, an inner side of the outer peripheral portion 10 of the common cladding tube 1 is sometimes dug to form a stepped portion $13_2$ on the sides of the hole $V_1$ and the hole $V_5$ in addition to form a third end $13_1$ in the end-face working step. In this case, the thicknesses between the outer peripheral portion 10 and the holes $V_1$ and $V_5$ on the outermost periphery are changed at the second end 12. For this reason, if d3 is small, nonuniform distortion and fracture are sometimes caused around the stepped portion $13_2$ by a heating process for connecting the glass tube to the second end 12. When d3 is set at 20 mm or more, as described above, even when the hole side of the outer peripheral portion 10 of the common cladding tube 1 is dug, nonuniform distortion and fracture due to the distortion can be prevented from occurring in the outer peripheral portion 10 of the dug common cladding tube 1 (around the stepped portion $13_2$) by the heating process when connecting the glass tube to the second end 12.

As illustrated in FIG. 2A, even when the stepped portion $13_2$ is not formed, if d3 is small, when connecting the glass tube to the second end 12, heat is transferred to the third end 13 by the heating process for the second end 12 and the core rods inserted in the holes $V_1$ to $V_5$ may melt and close the holes $V_1$ to $V_5$. Accordingly, even when the stepped portion $13_2$ is not formed, d3 is preferably set at 20 mm or more. While the end-face working step is performed after the preform forming step in the embodiment, the preform forming step may be performed after the end-face working step.

Figure 3:
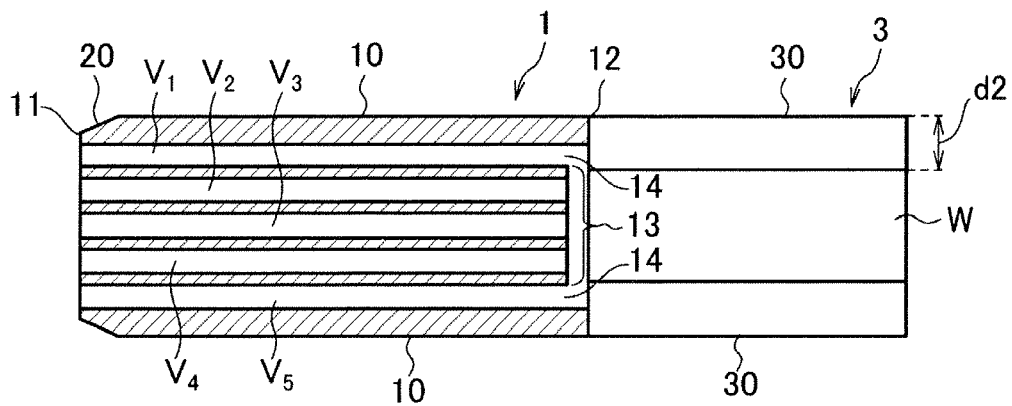
FIG. 3 illustrates a connection step in the production method for the multicore optical fiber according to the embodiment.

FIG. 3 illustrates a connection step in the production method for the multicore optical fiber according to the embodiment of the present invention. FIG. 3 illustrates a state in which a glass tube 3 having a thickness d2 is connected to the second end 12 of the common cladding tube 1. In connection, the second end 12 of the common cladding tube 1 and the glass tube 3 are placed close to each other, the common cladding tube 1 and the glass tube 3 are heated by, for example, a burner while being rotated, and the second end 12 of the common cladding tube 1 and an end portion of the glass tube 3 are melted to combine the common cladding tube 1 and the glass tube 3. Even when dv−d1 is smaller than d2, a gap 14 defined by the third end 13 formed by digging is kept, and communication with an inside W of the glass tube 3 is maintained through the holes $V_1$ and $V_5$ and the gap 14 after the common cladding tube 1 and the glass tube 3 are combined.

While FIG. 3 shows that the connection step is performed immediately after the end-face working step, the connection step may be performed at any time after the end-face working step and before the drawing step. For example, the connection step may be performed after the insertion step following the end-face working step. When the connection step is performed after the insertion step, if the common cladding tube 1 and the glass tube 3 are rotated in the connection step, core rods 15 are sometimes moved to the first end 11 or the second end 12 by, for example, vibration due to the rotation. Hence, it is sometimes preferable to perform the connection step before the insertion step.

The glass tube 3 is used to hang and support the common cladding tube 1 in the later drawing step. For this reason, if a connection area S between the second end 12 of the common cladding tube 1 and the glass tube 3 is small and a great weight is applied to a connected portion between the second end 12 of the common cladding tube 1 and the glass tube 3, the tensile stress generated per unit area of the connecting interface between the second end 12 of the common cladding tube 1 and the glass tube 3 increases. For this reason, fracture may occur at the connected portion during the drawing step. Accordingly, the tensile stress, calculated as M/S, due to the weight M applied to the connected portion is preferably less than or equal to 2 kgf/cm². Therefore, it is necessary to consider the weight of the common cladding tube 1, the digging amount in the end-face working step, the weight of the core rods in an insertion step to be described next, and the sealing method in a sealing step so that the tensile stress becomes 2 kgf/cm².

Figure 4:
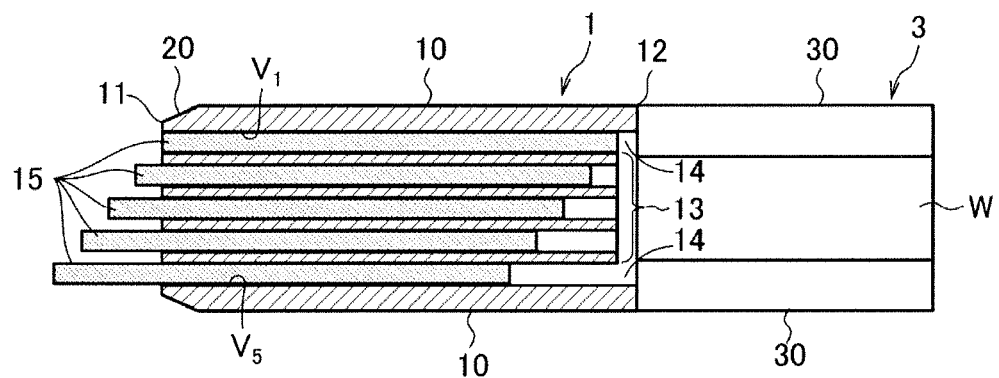
FIG. 4 illustrates an insertion step in the production method for the multicore optical fiber according to the embodiment.

FIG. 4 illustrates an insertion step of inserting core rods 15 made of silica glass into the plural holes $V_1$ to $V_5$ in the common cladding tube 1. While the core rods 15 are inserted in the holes $V_1$ to $V_5$ from the first end 11, if the connection step is not already performed and the glass tube 3 is not connected to the second end 12, the core rods 15 can be inserted in the holes $V_1$ to $V_5$ from the second end 12. The outer diameter of the core rods 15 is slightly smaller than the inner diameter of the holes $V_1$ to $V_5$. Thus, even when the core rods 15 are inserted in the holes $V_1$ to $V_5$, depressurization can be performed to the first end 11 of the holes $V_1$ to $V_5$ through the second end 12 of the holes $V_1$ to $V_5$.

In the insertion step, the core rods 15 may be inserted to the third end 13, like the uppermost core rod 15 in FIG. 4 not to waste the core rods 15, since the material of the common cladding tube 1 is not present on the side of the third end 13 closer to the second end 12.

Figure 5:
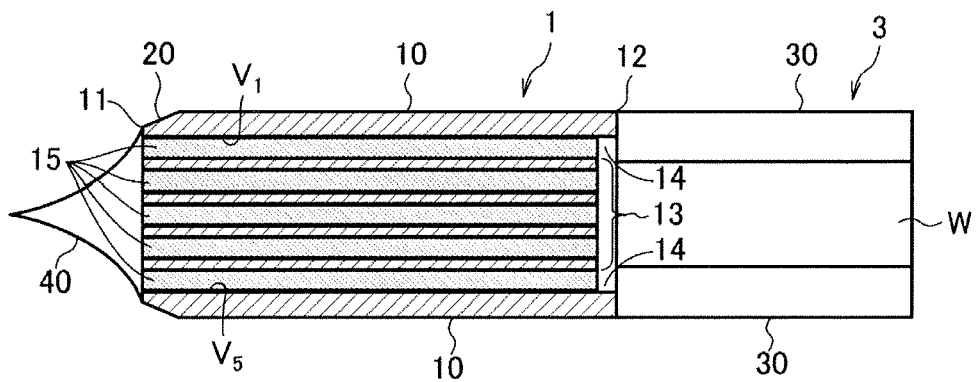
FIG. 5 illustrates a sealing step in the production method for the multicore optical fiber according to the embodiment.

FIG. 5 illustrates a state in which the first end 11 of the common cladding tube 1 is sealed by performing a sealing step. By sealing, the holes $V_1$ to $V_5$ at the first end 11 of the common cladding tube 1 are closed and are brought into an airtight state. FIG. 5 shows that the first end 11 of the common cladding tube 1 is sealed with a glass block 40 having a conical side surface. According to this embodiment, the first end 11 can be more easily sealed than when the common cladding tube 1 itself is softened and deformed.

The glass block used for sealing is not limited to the conical glass block 40, and a columnar glass block 40 may be used. Alternatively, another glass tube is connected to the first end 11 of the common cladding tube 1, the first end 11 is heated while depressurizing the holes $V_1$ to $V_5$, and the common cladding tube 1 and the glass block are drawn to increase the distance therebetween, whereby the first end 11 may be sealed by combining the common cladding tube 1 and the core rods 15 at the first end 11. When a rod-in collapse process is performed, it is necessary to perform the drawing step after removing the glass tube connected to the first end of the common cladding tube 1. Hence, it is often easier to seal with the glass block 40.

When the core rods 15 are respectively inserted in the holes $V_1$ to $V_5$ in the insertion step, they may be recessed from the first end 11. That is, spaces may be formed between end portions of the core rods 15 at the first end 11 and the first end 11 of the common cladding tube 1. By virtue of these spaces, the diameter of the first end 11 is reduced by the surface tension of silica glass melted by heating when sealing the first end 11 in the sealing step. This can reduce, for example, the size of the glass block and the weight of the glass block.

In the preform forming step, the outer peripheral portion 10 of the common cladding tube 1 may be cut at the first end 11 of the common cladding tube 1 to form a chamfer 20. Thus, when the first end 11 is sealed with the glass block in the sealing step, the weight of the glass block can be reduced and the sum of the weights of the glass block, the common cladding tube, and the core rods inserted in the holes can be reduced by decreasing the diameter of the glass block. Therefore, fracture of the connecting interface of the common cladding tube 1 and the glass block can be prevented. Also, the glass block can be prevented from falling by its own weight at the start of the drawing step.

Figure 6:
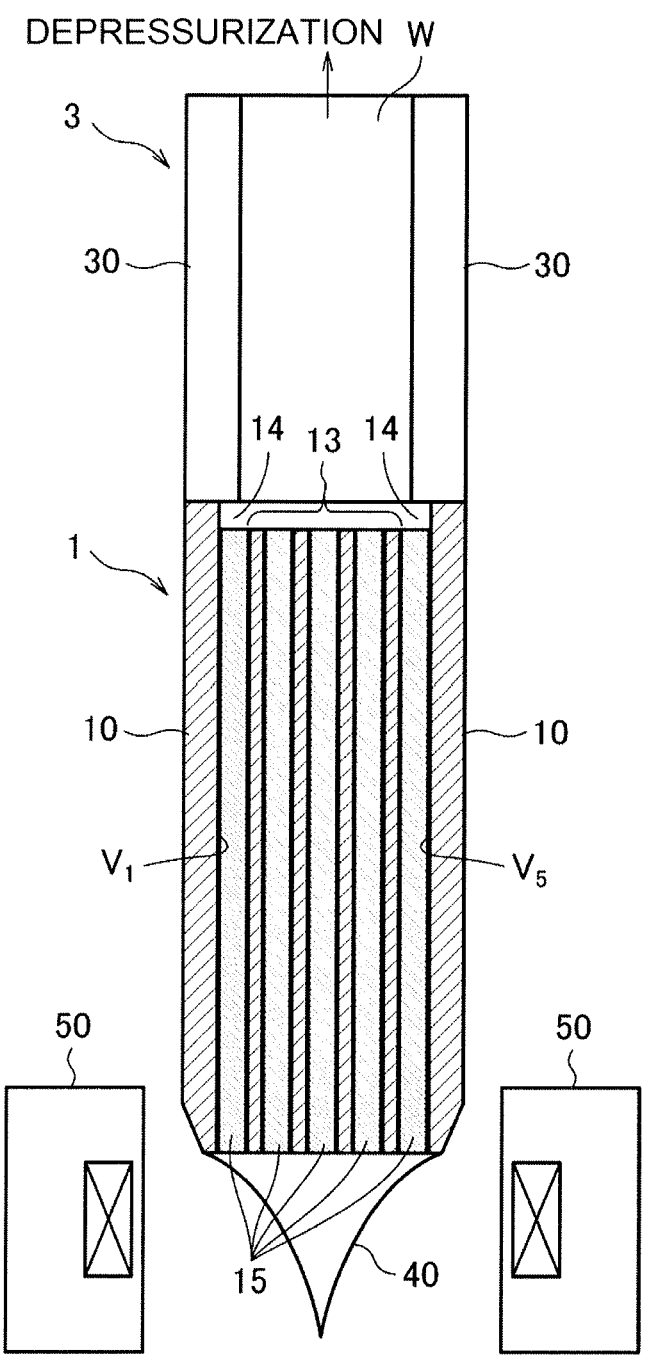
FIG. 6 illustrates a drawing step in the production method for the multicore optical fiber according to the embodiment.

FIG. 6 illustrates a state where the common cladding tube 1, in which the core rods 15 are inserted in the holes $V_1$ to $V_5$, the first end 11 is sealed, and the glass tube 3 is connected to the second end 12, is placed in an upright position with the first end 11 facing downward. The insides of the holes $V_1$ to $V_5$ having the core rods 15 inserted therein are depressurized through the glass tube 3 and the first end 11 of the common cladding tube 1 is put in a heating furnace 50. Since the first end 11 is sealed with, for example, the glass block 40, the core rods 15 are prevented from falling. Moreover, since the holes $V_1$ and $V_5$ communicate with the inside W of the glass tube 3 through the gap 14, they are depressurized through the inside W of the glass tube 3.

By heating the first end 11 in this state, a glass drop is formed and falls. Fiber pulling is performed by a glass strand continuing from the falling glass drop. After that, a multicore optical fiber is produced by performing spinning while combining the common cladding tube 1 and the core rods 15 from the first end 11 in the drawing step.

From the above, according to the embodiment, even when, in the end-face working step, the thickness between the outer peripheral portion 10 of the common cladding tube 1 and the holes $V_1$ and $V_5$ on the outermost periphery is reduced and the inner diameter of the holes $V_1$ to $V_5$ is decreased, the holes $V_1$ to $V_5$ can be depressurized.

COMPARATIVE EXAMPLE

Figure 7A:
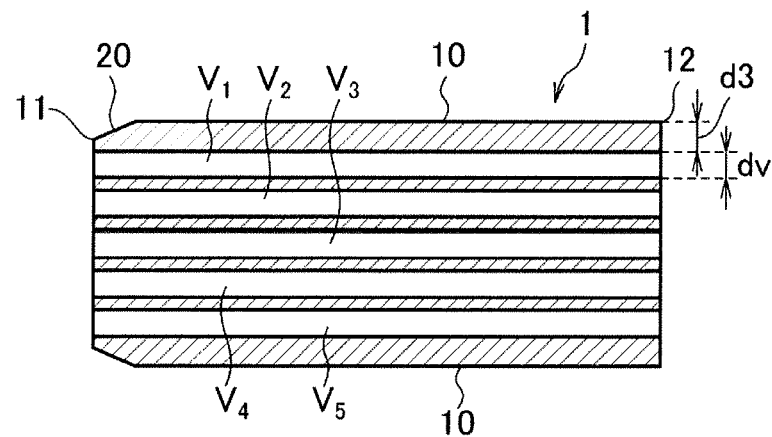
FIGS. 7A to 7E illustrate a production method for a multicore optical fiber according to a comparative example.

FIGS. 7A to 7E illustrate a production method for a multicore optical fiber according to a comparative example, and FIG. 7A illustrates a preform forming step. In the production method for the multicore optical fiber according to the comparative example, a common cladding tube 1 is formed in the preform forming step, similarly to the embodiment.

Figure 7B:
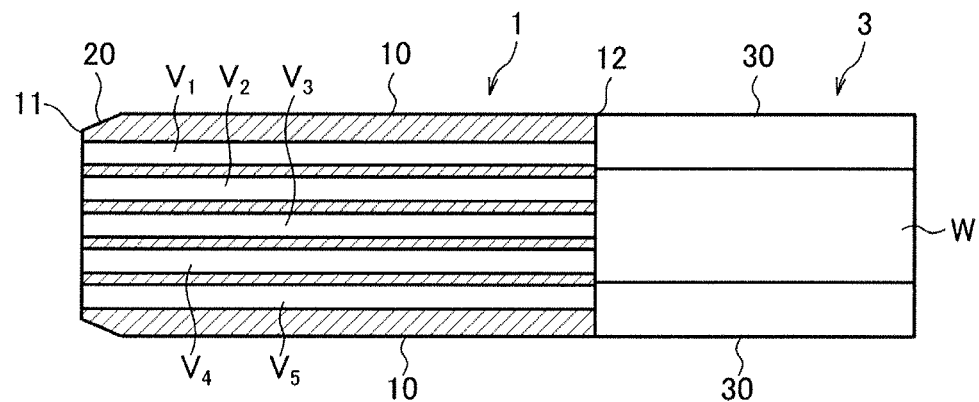

In the comparative example, the common cladding tube 1 and a glass tube 3 are connected without digging a second end 12 of the common cladding tube 1. FIG. 7B illustrates a state in which the glass tube 3 is connected to the second end 12 of the common cladding tube 1 in a connection step. In connection, similarly to the embodiment, the second end 12 of the common cladding tube 1 and the glass tube 3 are placed close to each other, the common cladding tube 1 and the glass tube 3 are heated by, for example, a burner while being rotated, and the second end 12 of the common cladding tube 1 and an end portion of the glass tube 3 are melted to combine the common cladding tube 1 and the glass tube 3. When the common cladding tube 1 and the glass tube 3 are connected without digging the second end 12 of the common cladding tube 1, if dv+d3 is smaller than d2, holes $V_1$ and $V_5$ are closed at the second end 12 by an outer peripheral portion 30 of the glass tube 3.

Figure 7C:
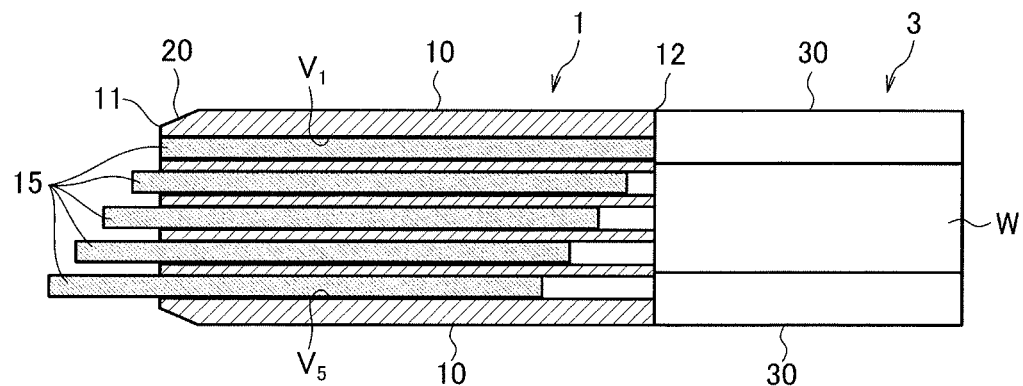

FIG. 7C shows that core rods 15 are inserted in the holes $V_1$ to $V_5$ in an insertion step while the holes $V_1$ and $V_5$ are closed by the glass tube 3 at the second end 12. Even when the core rods 15 are inserted, the holes $V_1$ and $V_5$ remain closed by the glass tube 3 at the second end 12.

Figure 7D:
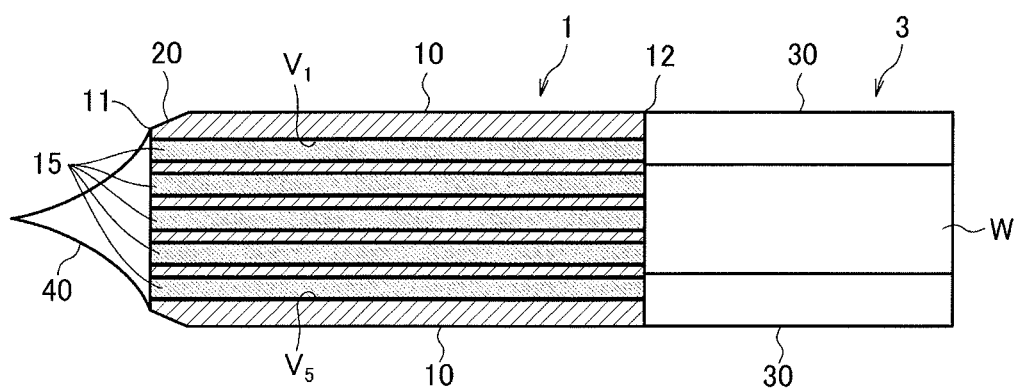

FIG. 7D illustrates a state in which the first end 11 is sealed with a glass block 40 in a sealing step. The holes $V_1$ and $V_5$ are completely closed at the first end 11 and the second end 12.

Figure 7E:
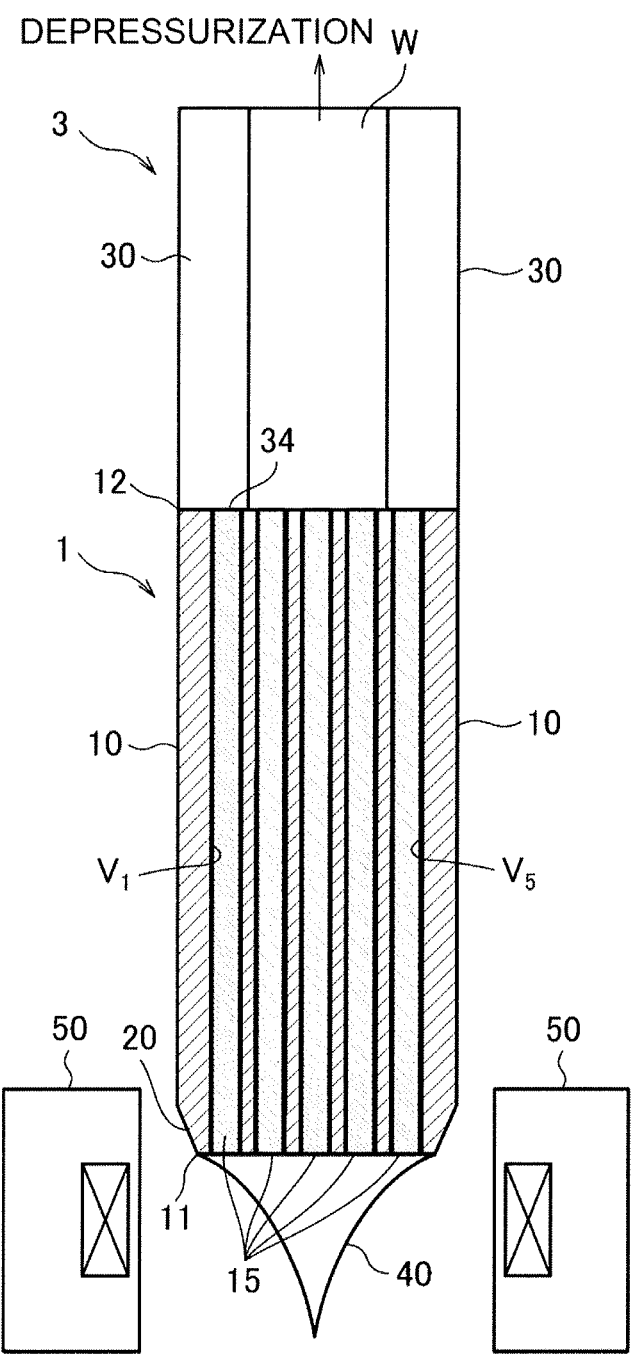

FIG. 7E illustrates a state in which the common cladding tube 1 with the glass tube 3 connected to the second end 12 is placed in an upright position with the first end 11 facing downward in a drawing step. Even when the insides of the holes $V_1$ to $V_5$ are intended to be depressurized through the glass tube 3, since the holes $V_1$ and $V_5$ are completely closed at the second end 12, the insides of the holes $V_1$ and $V_5$ cannot be depressurized. For this reason, when drawing is performed, bubbles are left around the cores due to air remaining in the holes $V_1$ and $V_5$, and this sometimes lowers the quality of a multicore optical fiber to be produced. To solve this problem, the connection step and the sealing step must be performed in a depressurized environment, and must be performed by larger-scale equipment than when the inside W of the glass tube 3 is depressurized in a spinning step. This increases the production cost for the multicore optical fiber.

What is claimed is:

1. A production method for a multicore optical fiber, comprising:
   a preform forming step of forming a common cladding tube made of silica glass and having a plurality of holes extending in an axial direction between a first end and a second end;
   an end-face working step of digging the common cladding tube except for an outer peripheral portion from the second end toward the first end to a predetermined depth to form a third end;
   a connection step of connecting a glass tube to the second end;
   an insertion step of inserting core rods made of silica glass into the plurality of holes of the common cladding tube to the third end;
   a sealing step of sealing the plurality of holes at the first end; and
   a drawing step of spinning the multicore optical fiber while depressurizing insides of the plurality of holes through the glass tube and combining the common cladding tube and the core rods from the first end.

2. The production method for the multicore optical fiber according to claim 1, wherein
   the predetermined depth is 20 mm or more.

3. The production method for the multicore optical fiber according to claim 1, wherein
   a tensile stress applied to a connecting interface between the common cladding tube and the glass tube in the drawing step is 2 kgf/cm$^2$ or less.

4. The production method for the multicore optical fiber according to claim 1, wherein
   the sealing step includes connecting a glass block to the first end to seal the plurality of holes at the first end.

* * * * *